(12) United States Patent
Fang (10) Patent No.: US 6,880,257 B1
(45) Date of Patent: Apr. 19, 2005

(54) SIGNAL SAMPLING CIRCUIT OF A TILT SENSOR

(75) Inventor: Zhi-Hong Fang, Taichung (TW)

(73) Assignee: Asia Optical Co., Inc. (TW)

( * ) Notice: Subject to any disclaimer, the term of this patent is extended or adjusted under 35 U.S.C. 154(b) by 0 days.

(21) Appl. No.: 10/813,065

(22) Filed: Mar. 31, 2004

(30) Foreign Application Priority Data

Jan. 8, 2004 (TW) .................................... 93100477 A (51) Int. Cl.[7] .............................................. G01C 9/06
(52) U.S. Cl. ................... 33/366.15; 33/366.11
(58) Field of Search ..................... 33/366.11, 366.14, 33/366.15, 366.18, 366.19, 366.21, 366.22, 366.26, 390

(56) References Cited

U.S. PATENT DOCUMENTS

| | | | | |
|---|---|---|---|---|
| 3,290,786 A | * | 12/1966 | Parkin | ................. 33/366.22 |
| 3,486,238 A | * | 12/1969 | Hansen | ................. 33/366.14 |
| 3,991,361 A | * | 11/1976 | Mattern et al. | ................. 33/356 |
| 4,231,257 A | * | 11/1980 | Yoshino et al. | ................. 33/775 |
| 5,027,522 A | * | 7/1991 | Cagan et al. | ............. 33/366.14 |
| 5,428,902 A | * | 7/1995 | Cheah | ................. 33/366.14 |
| 5,774,996 A | * | 7/1998 | Ogawa et al. | ............ 33/366.12 |

* cited by examiner

Primary Examiner—G. Bradley Bennett (57) ABSTRACT

A signal sampling circuit of a tilt sensor, suitable to be used in a tilt sensor, is described. The signal sampling circuit has a signal-generating module, a sample and hold module, and a differential module. The signal-generating module regularly generates a plurality of level-measuring signals in equal intervals, and alternately and multi-directionally sends them to the first input pin and the second input pin of the tilt sensor in turn, respectively. Then, the tilt sensor outputs in order the corresponding first and second output signal. The sample and hold module samples and holds the first and the second output signal in turn, and outputs the first and the second sampling signals, respectively. The differential module receives and differentiates the first and the second sampling signals, and outputs a level-estimating-result signal to a micro controller unit to derive the tilt information of one direction.

32 Claims, 5 Drawing Sheets

SIGNAL SAMPLING CIRCUIT OF A TILT SENSOR

FIELD OF THE INVENTION

The present invention relates to a signal sampling circuit of a tilt sensor, and more particularly, to producing the input signals to the input of the tilt sensor and processing the output signals from the output of the tilt sensor to determine the slant of a level-adjusting device adjust a level.

BACKGROUND OF THE INVENTION

In general, tilt sensors can be classified into two kinds. One is the single axis tilt sensor, and the other is the dual axis tilt sensor. The single axis tilt sensor measures the slant of one direction, whereas the dual one estimates the slant of a plane.

Figure 1:
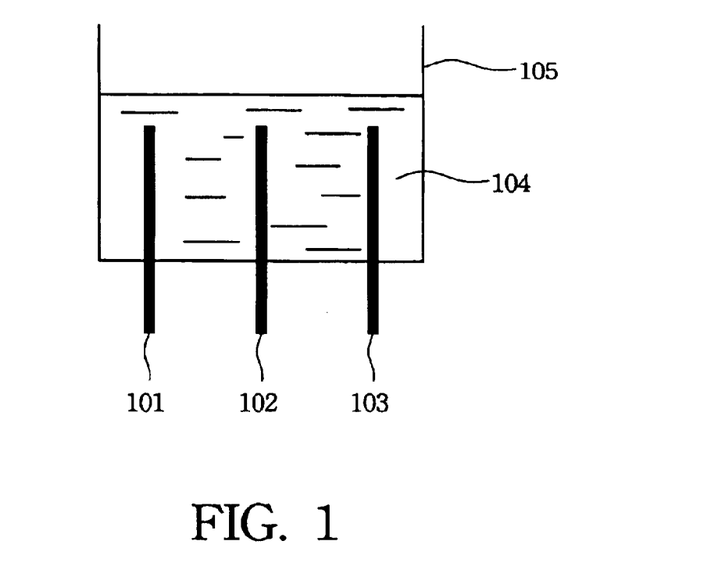
FIG. 1 illustrates the basic structure of a tilt sensor.

Tilt sensors have a variety of applications due to their accurate measurements in level evaluating. Tilt sensors also have good reliability and are easy to obtain, so they are originally designed for the aim of weapons, the navigation of aircraft, and now the alignment of automobile wheels, even the detection of earthquakes and the applications of laser tilt meters. The principle of how the tilt sensor works is illustrated in FIG. 1. When the surface of the earth is not in horizontal status, the tilt sensor tilts, and the surface of the electrolyte in the tilt sensor remains horizontal status due to gravity. The electrolyte is electrically conductive, and the conductivity between the two electrodes of the tilt sensor is proportional to the length of that the electrode is immersed in the electrolyte. Thus, the resistance between the first and the second electrode and the resistance between the second and the third electrode are both changed in proportion to the tilt angle. Therefore, the slant of the tilt sensor is derived from the resistance corresponding to the tilt angle.

Figure 2:
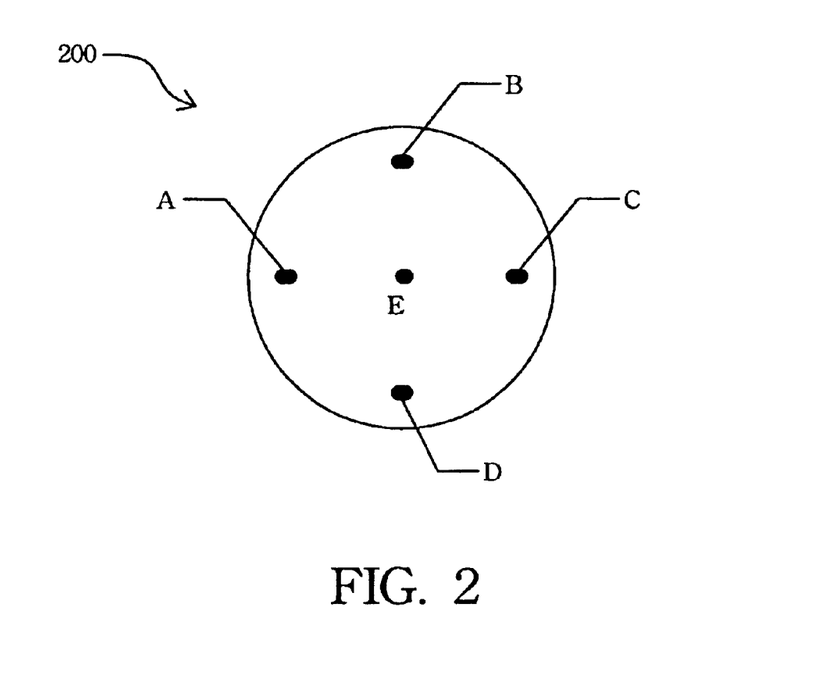
FIG. 2 illustrates a bottom view of a tilt sensor.

FIG. 2 illustrates a bottom view of a dual axis tilt sensor. Four outer electrodes A, B, C, and D are placed crisscross as signal inputs, and the central electrode E as signal output.

Figure 3:
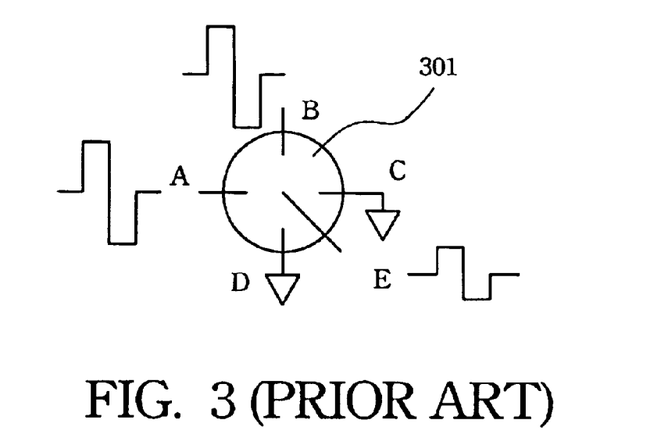
FIG. 3 illustrates the input method of a conventional tilt sensor.

Please refer to FIG. 3 illustrating the input method of a conventional dual axis tilt sensor. The input method of the conventional dual axis tilt sensor is unidirectional, that is, one axis is excited at a time. Outer electrode C and outer electrode D of the sensor 301 are grounded. And outer electrode B of the sensor 301 is also first disconnected and then a symmetric square waveform is inputted into outer electrode A as the input signal. To prevent the electrolyte from being polarized, the DC components of the input signal must be zero. Hence, the input signal should be a symmetric square waveform. When it is not in horizontal status, the dual axis tilt sensor tilts, and the conductivity between the two electrodes is proportional to the length of electrode immersed in the electrolyte. Thus, the resistance between the two electrodes is changed in proportion to the tilt angle, thus the input signal is then reduced or amplified due to the variation of resistance, so as to acquire an asymmetric output signal from the central electrode E. By analyzing the voltage of the output signal, the level of the direction in outer electrode A and grounded outer electrode C will be gotten. After that, outer electrode A is disconnected and then a symmetric square waveform is input into outer electrode B as the input signal. These steps are repeated and the output signal is analyzed in the same way. The level of the other direction in outer electrode B and grounded outer electrode D can be gotten afterwards.

Since the input signals must be switched frequently and time sequence is also needed to access the signals correctly by this method, thus the signals cannot be sampled in real time. Otherwise, due to the serious interference between each input signal, the sensitivity is low and the fluctuation of the signals are great, thus the conventional method can not arrive the precise measurement. Furthermore, since a negative voltage for input signals is needed, a negative voltage supplier with high stability should be used. Otherwise, the switching of positive voltage and negative voltage also results in high complexity in circuit design, and it also increases the difficulty of the circuit design.

SUMMARY OF THE INVENTION

Hence, an object of the present invention is to provide a signal sampling circuit of a tilt sensor. Due to the input method is not unidirectional and the signal of positive voltage and negative voltage need not be frequently switched, so the stability of the present invention is better and interference between each input signal is also decreased, thus the accuracy of the present invention is increased.

An alternative objective of the present invention is to provide a signal sampling circuit of a tilt sensor in which the input method is not unidirectional. Therefore, the signal sampling circuit need not to access the signals by the time sequence, thus the signals can be sampled whenever necessary.

Another objective of the present invention is to provide a signal sampling circuit of a tilt sensor in which the input method is alternate and multidirectional. Signals of the same electrical property are input into the outer electrodes of the tilt sensor in turn to avoid the DC components of the signals, thus the electrolyte of the tilt sensor is not electrolyzed.

Still another objective of the present invention is to provide a signal sampling circuit of a tilt sensor in which only one power supplier of the same electrical property is used. Thus the signals can be processed stably. Accordingly, the complexity in the design of the circuits is reduced.

According to the aforementioned objectives, a signal sampling circuit of a tilt sensor is provided, which is suitable for a laser tilt meter. The tilt sensor has one output pin, at least one pair of the first and the second input pins set symmetrically in each side of the output pin, and electrolyte electrically conductive between the first input pin and the output pin and between the second input pin and the output pin. The signal sampling circuit comprises a signal-generating module, a sample and hold module, and a differential module. The signal-generating module regularly generates a plurality of level-measuring signals with each equal intervals, and then alternately and multi-directionally sends them to the first input pin and the second input pin of the tilt sensor respectively, so that the tilt sensor outputs the corresponding first and second output signal in turn. Otherwise, the sample and hold module samples and holds the first and second output signal in order so that it can output the first and the second sampling signals respectively. After that, the differential module receives and differentiates between the first and the second sampling signals so that it outputs a level-estimating-result signal to a micro controller unit to derive the tilt information of one direction.

According to the objectives of the present invention, a method for the signal sampling circuit of a tilt sensor is provided. First, the signal-generating module generates and alternately sends the level-measuring signals to the input pins of the tilt sensor as input signals, and to the sample and hold module as trigger signals simultaneously. Next, the output pin of the tilt sensor outputs a series of output signals composed of a plurality of output signals corresponding to the level-measuring signals to the sample and hold module. The sample and hold module respectively samples and holds the series of output signals in accordance with the trigger signals, so as to separate the series of output signals into four holding signals, and then sends the divided holding signals to the differential module. The differential module differentiates the holding signals of the same direction, and respectively outputs the level-estimating-result signals of two directions to a micro controller unit to analyze. Thus the tilt information of a plane is obtained.

In accordance with the embodiments of the present invention, the method of inputting the signals into the tilt sensor is modified from unidirectional to alternate and multi-directional so that interference between each signal is reduced. Additionally, the input signals have the same electrical property, so only one power supplier of the same electrical property is needed, and the circuit is also simplified. Meanwhile, the output signals are divided by sampling and holding method and it can be accessed at any time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, where.

DETAILED DESCRIPTION OF THE PREFERRED EMBODIMENT

Figure 4:
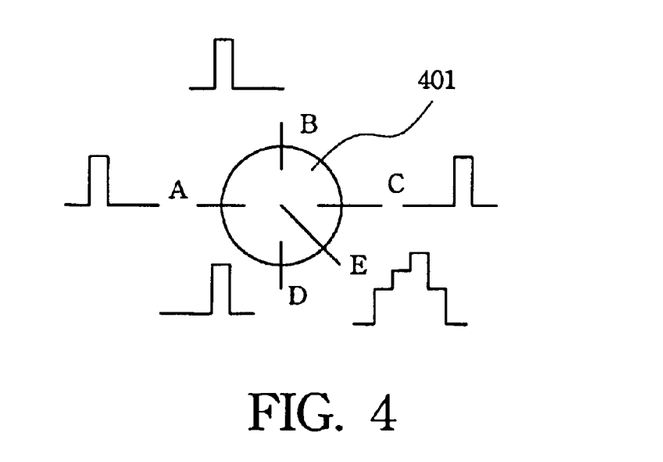
FIG. 4 illustrates the input method of the tilt sensor of the present invention.

This invention discloses a signal sampling circuit of a tilt sensor, suitable to be used in a laser tilt meter to produce the input signals to the tilt sensor and to process the output signals from the tilt sensor. The signal sampling circuit comprises a signal-generating module, a sample and hold module, and a differential module. The signal-generating module regularly generates a plurality of level-measuring signals with equal intervals, and then sends the signals to the tilt sensor alternately and multi-directionally in turn, respectively. Please refer to FIG. 4. Signals with the same single electrical property are sent to the input pins A, B, C, D of the tilt sensor alternately and multi-directionally in turn. The electrical property of the signals can be positive or negative. After that, the output pin E of the tilt sensor 401 generates a series of output signals composed of a plurality of output signals according to the slant status. Otherwise, because the method of inputting signals alternately doesn't generate the DC components of the signals, and the signals all have the same electrical property, only one single electrical property power supplier is needed. Thus, the circuit design can be simplified. Meanwhile, because of using the method of inputting signal alternately, no other input pin of the tilt sensor can receive signal when one input pin of the tilt sensor is receiving input signal. Hence, the signals between A–C direction and B–D direction will not interfere with each other.

Figure 5:
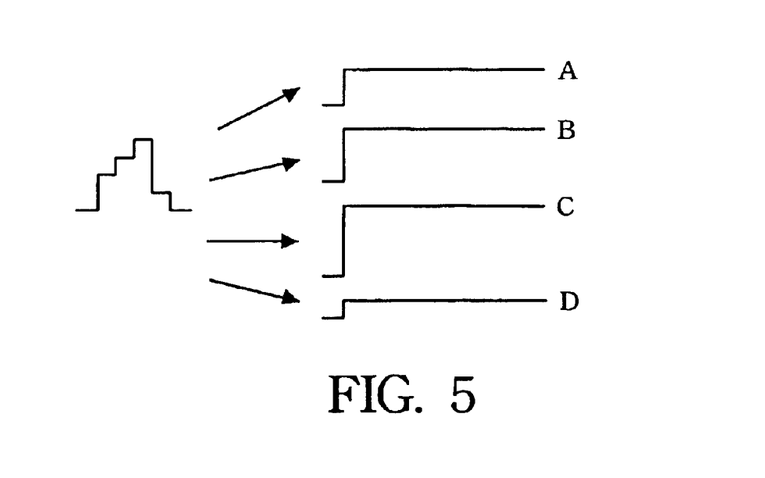
FIG. 5 illustrates the division of the output signal of the present invention.

Next, please refer to FIG. 5. The sample and hold module separates the series of output signals composed of a plurality of output signals into four independent and continuous holding signals. Therefore, the holding signals can be accessed and analyzed immediately without concerning the time sequence. For this reason, the response time of the system can be shortened and the complexity of programming can be lowered.

The differential module respectively differentiates the holding signals of the same direction (A–C direction or B–D direction) to obtain the level-estimating-result signal. Since the variations of the two divided output signals of the same direction are opposite, the differenced level-estimating-result signal will be more sensitive to the slant status. And then the differenced level-estimating-result signal is sent to a micro controller unit to analyze for derivation the slant information of one direction. Finally, base on the slant information to determine the horizontal status and then according to the horizontal status to drive a level-adjusting device. After many recursions and modifications, the surface of the electrolyte in the tilt sensor will become level at last. Two embodiments are provided in the following to describe the present invention in detail.

The First Embodiment:

The embodiment describes the present invention applied in a dual axis tilt sensor. Please refer to FIG. 6 and FIG. 7. The present invention comprises a signal-generating module 601, a sample and hold module 602, and a differential module 603. First, the signal-generating module 601 regularly generates a plurality of level-measuring signals with equal intervals. The level-measuring signals are the first level-measuring-signal 606, the second level-measuring-signal 607, the third level-measuring-signal 608, and the fourth level-measuring-signal 609. These level-measuring signals have the same time sequence and pulse width, and are spaced at one or a plurality of intervals. They are alternately and multi-directionally sent to the first input pin, the second input pin, the third input pin, and the fourth input pin of the dual axis tilt sensor 605 in turn, respectively. Otherwise, the first and the third input pins are settled opposite to the second and the fourth input pins. According to the level-measuring signals, the output pin of the tilt sensor generates a series of output signals 614 comprising the first measuring cycle A1, the second measuring cycle A2, the third measuring cycle A3 and he forth measuring cycle A4 in every cycle of the series of output signals as shown in FIG. 7. The first and the third input pins output signals containing the tilt information of one direction via the output pin of the dual axis tilt sensor 605, otherwise, the second and the fourth input pins output signals containing the tilt information of the other direction via the output pin of the dual axis tilt sensor 605. That is, the series of output signals 614 from the output pin include the tilt information of two directions.

Simultaneously, these level-measuring signals are also sent to the sample and hold module 602 as trigger signals 610, 611, 612, and 613 for sampling and holding the first output signal 701, the second output signal 702, the third output signal 703, and the fourth output signal 704 respectively. Thus the holding signals 615, 616, 617, 618 corresponding to the level-measuring signals 606, 607, 608, 609 will be separated. These holding signals represent the level condition measured by the pins A–E, B–E, C–E, and D–E of the tilt sensor as illustrated in FIG. 2. The following will describe in detail the method of sampling and holding the series of output signals 614 to divide the holding signals. As shown in the drawings, the first level-measuring-signal 606, the second level-measuring-signal 607, the third level-measuring-signal 608, and the fourth level-measuring-signal 609 have the same time sequence and are spaced at one interval, and alternately sent to each input pin of the dual axis tilt sensor 605 in turn, respectively. In the first cycle A1, taking the first level-measuring-signal 606 as an example, suppose the first output signal 701 as shown in FIG. 7 is generated from the output pin of the dual axis tilt sensor 605 in accordance with the tilt condition, the first output signal 701 going through the sample and hold module 602 will be divided into the first holding signal 615 of which the voltage is equal to Va1 in the first output signal 701. The sample and hold module 602 will keep the voltage Va1 of the first holding signal 615 until the second cycle A2, and then changes to the voltage Va2 of the first output signal 705 in the second cycle A2. The voltage variation of the first output signal in every cycle represents the slant status that the input pins A–E direction of the dual axis tilt sensor 605 detect. Thus, the first holding signal 615 as shown in the drawings can be gotten. Similarly, the second holding signal 616, the third holding signal 617, and the fourth holding signal 618 can also be obtained. That is, the variation of voltage according to the slant status evaluated by the input pins B–E, C–E, and D–E can be acquired.

Figure 6:
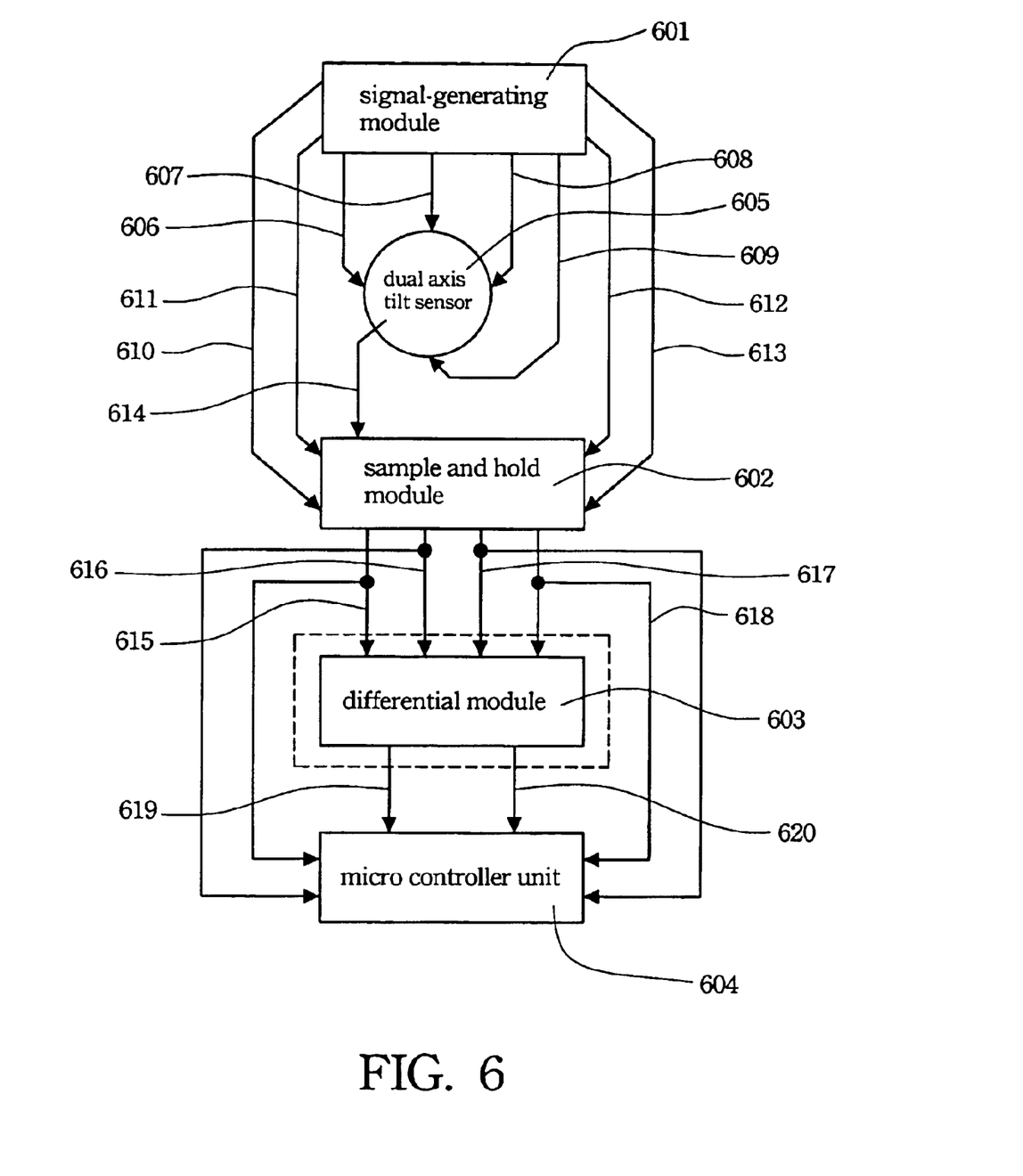
FIG. 6 illustrates the flow diagram of the embodiment according to the present invention.
Figure 7:
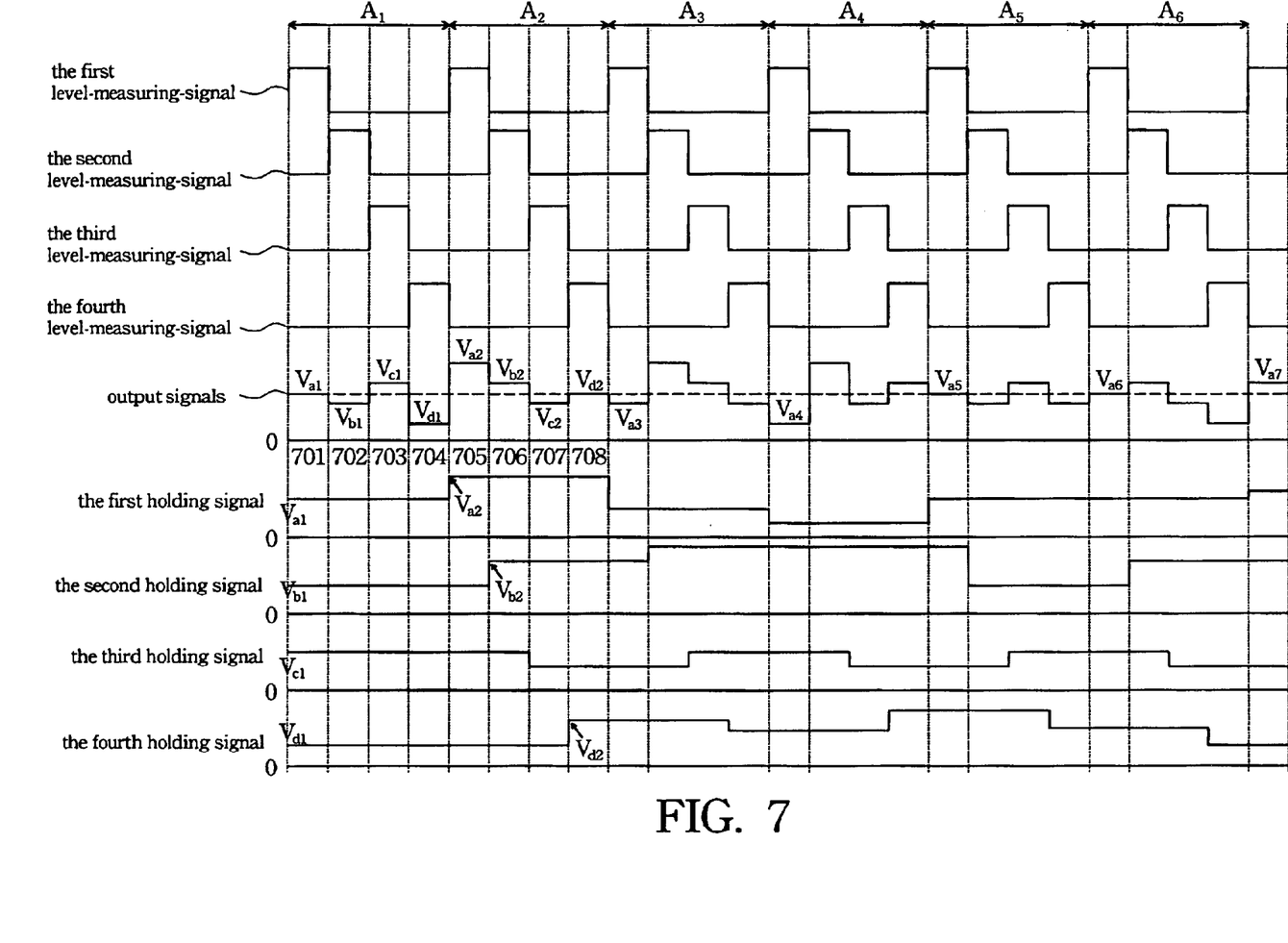
FIG. 7 illustrates the diagram of the signals of the embodiment according to the present invention.

Next, please refer to FIG. 6. The first holding signal 615, the second holding signal 616, the third holding signal 617, and the fourth holding signal 618 are sent to the differential module 603 to differentiate the holding signals (615–617 or 616–618) of the same direction (A–C or B–D). The first holding signal 615 and the third holding signal 617 are differentiated to get the first level-estimating-result signal 619, whereas the second holding signal 616 and the fourth holding signal 618 are differentiated to get the second level-estimating-result signal 620. When the tilt sensor is in horizontal status, the level-estimating-result signals are supposed to be zero, but to prevent the malfunction in processing the zero signals in the micro controller unit 604, a voltage Va is added to the holding signals of the same direction (A–C or B–D) to make the differential module 603 output a fixed voltage Va even though the tilt meter is level. The formulas for differentiating are Adata+Va−Cdata=OutData, and Bdata+Va−Ddata=OutData. When it is level, Adata=Cdata and Bdata=Ddata, where Adata, Bdata, Cdata and Ddata are the first holding signal 615, the second holding signal 616, the third holding signal 617, and the fourth holding signal 618 respectively. OutData is the first level-estimating-result signal 619 or the second level-estimating-result signal 620. The aforementioned differential module 603 can be a differential amplifier or a subtracter. Otherwise, the differential module 603 also can be omitted and the first holding signal 615, the second holding signal 616, the third holding signal 617, and the fourth holding signal 618 are sent directly to the micro controller unit 604 for differentiation.

Finally, the first level-estimating-result signal 619 and the second level-estimating-result signal 620 are sent to the micro controller unit 604. The signals in the micro controller unit 604 are sent through an A/D converter for analog/digital conversion and then compared with a table predetermined in the micro controller unit 604 listing the slant status vs. the level-estimating-result signal to derive the slant of the tilt meter and further to determine the feedback value afterwards. The feedback value is sent from the micro controller unit 604 to a level-adjusting device to drive the level-adjusting device. After many recursions and modifications, the level will be achieved.

Figure 8:
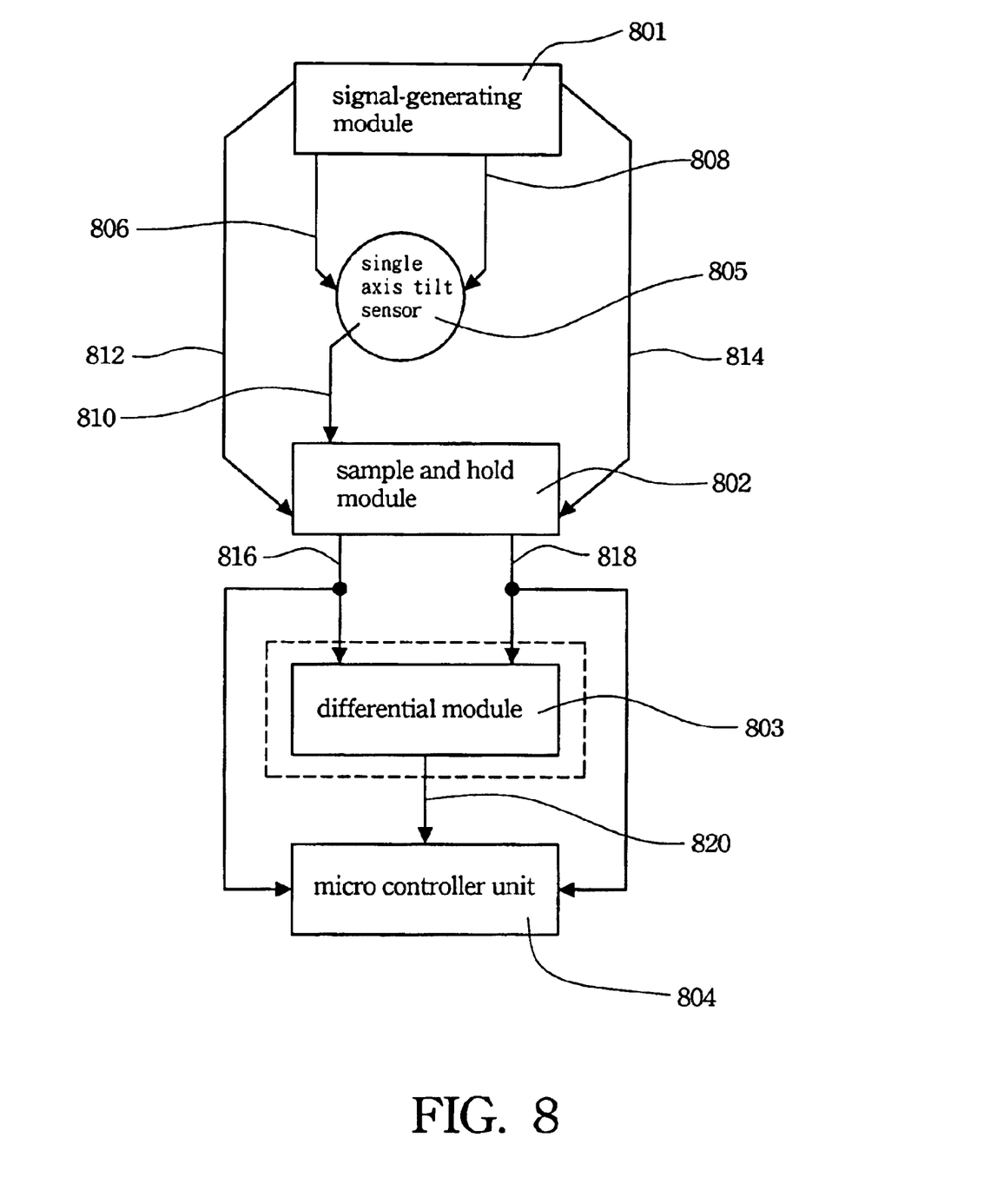
FIG. 8 illustrates the flow diagram of the other embodiment according to the present invention.

The Second Embodiment:

The embodiment describes the present invention applied in a single axis tilt sensor 805. Reference is made to FIG. 8. The present invention comprises a signal-generating module 801, a sample and hold module 802, and a differential module 803. The differences between the first and the second embodiments are that the dual axis tilt sensor 605 is replaced with the single axis tilt sensor 805, and the four level-measuring signals representing two directions originally are replaced with the first level-measuring-signal 806 and the second level-measuring-signal 808 representing only one direction. Others are the same as described with reference to the first embodiment.

Hence, from the embodiments of the present invention, the advantages of the present invention are as follows. First, the input method of the tilt meter of the present invention is not unidirectional, so the input signals need not to be switched frequently. Furthermore, the signals in the present invention are independent from one another, so when the slant status of one direction changes, the output signals of the other direction will not change. The independence of the signals makes the signals easier to be applied in the latter parts, such as the application in the tilt meter with high precision of which the input signal are with pulse width modulation (PWM). Additionally, the circuits in the present invention are simple and easy to be produced.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A signal sampling circuit, suitable in a tilt sensor, wherein the tilt sensor comprises an output pin, at least a pair of a first input pin and a second input pin set symmetrically in each side of the output pin, and electrolyte electrically conductive between the first input pin and the output pin and between the second input pin and the output pin, the signal sampling circuit comprising:

a signal-generating module regularly generating a plurality of level-measuring signals with equal intervals, and alternately and multi-directionally sending the level-measuring signals to the first input pin and the second input pin of the tilt sensor in turn, respectively, therefore, the output pin of the tilt sensor outputs a first output signal and a second output signal in order corresponding to the level-measuring signals;

a sample and hold module sampling and holding the first output signal and the second output signal in turn, and outputting a first holding signal and a second holding signal, respectively; and a differential module receiving and differentiating the first holding signal and the second holding signal, outputting a level-estimating-result signal, and sending the level-estimating-result signal to a micro controller unit to derive the tilt information of one direction.

2. The signal sampling circuit of claim 1, wherein the signal-generating module alternately and multi-directionally inputs the level-measuring signals to the tilt sensor.

3. The signal sampling circuit of claim 1, wherein the electrical property of the level-measuring signals sent from the signal-generating module is positive or negative.

4. The signal sampling circuit of claim 1, wherein the signal-generating module is a signal generator or a pulse generating circuit.

5. The signal sampling circuit of claim 1, wherein the tilt sensor is a single axis electrolytic tilt sensor or a dual axis electrolytic tilt sensor.

6. The signal sampling circuit of claim 1, wherein the sample and hold module is a sample and hold circuit.

7. The signal sampling circuit of claim 1, wherein the differential module is a differential amplifier, a subtracter or a micro controller.

8. The signal sampling circuit of claim 1, wherein the level-measuring signals are identically wide and are spaced at one or a plurality of intervals.

9. The signal sampling circuit of claim 1, wherein the sample and hold module triggers and outputs the first holding signal and the second holding signal according to a plurality of trigger signals, the trigger signals being level-measuring signals or signals having a same time sequence as the level-measuring signals.

10. A tilt estimating circuit, suitable to estimate the slant, the tilt estimating circuit comprising:
   a tilt sensor comprising a shell, an output pin, at least a pair of a first input pin and a second input pin set symmetrically in each side of the output pin, and electrolyte electrically conductive between the first input pin and the output pin and between the second input pin and the output pin;
   a signal-generating module regularly generating a plurality of level-measuring signals with equal intervals, and alternately and multi-directionally sending the level-measuring signals to the first input pin and the second input pin of the tilt sensor in turn respectively, therefore, the output pin of the tilt sensor output a first output signal and a second output signal in order corresponding to the level-measuring signals;
   a sample and hold module sampling and holding the first output signal and the second output signal in turn, and then outputting a first holding signal and a second holding signal, respectively;
   a differential module receiving and differentiating the first holding signal and the second holding signal, and outputting a level-estimating-result signal; and
   a micro controller unit receiving the level-estimating-result signal and comparing the level-estimating-result signal with a predetermined table to obtain tilt information of one direction.

11. The tilt estimating circuit of claim 10, wherein the signal-generating module alternately and multi-directionally inputs the level-measuring signals into the tilt sensor.

12. The tilt estimating circuit of claim 10, wherein an electrical property of the level-measuring signals sent from the signal-generating module is positive or negative.

13. The tilt estimating circuit of claim 10, wherein the signal-generating module is a signal generator or a pulse generating circuit.

14. The tilt estimating circuit of claim 10, wherein the tilt sensor is a single axis electrolytic tilt sensor or a dual axis electrolytic tilt sensor.

15. The tilt estimating circuit of claim 10, wherein the sample and hold module is a sample and hold circuit.

16. The tilt estimating circuit of claim 10, wherein the differential module is a differential amplifier, a subtracter or a micro controller.

17. The tilt estimating circuit of claim 10, wherein the level-measuring signals have a same width and are spaced at one or a plurality of intervals.

18. The tilt estimating circuit of claim 10, wherein the sample and hold module triggers and outputs the first holding signal and the second holding signal according to a plurality of trigger signals, the trigger signals being the level-measuring signals or signals having a same time sequence as the level-measuring signals.

19. A tilt estimating circuit, suitable to estimate the slant, the tilt estimating circuit comprising:
   a tilt sensor comprising a shell, an output pin, at least a pair of a first input pin and a second input pin set symmetrically in each side of the output pin, and electrolyte electrically conductive between the first input pin and the output pin and between the second input pin and the output pin;
   a signal-generating module regularly generating a plurality of level-measuring signals with equal intervals, and alternately and multi-directionally sending the level-measuring signals to the first input pin and the second input pin of the tilt sensor in turn respectively, therefore, the output pin of the tilt sensor output a first output signal and a second output signal in order corresponding to the level-measuring signals;
   a sample and hold module sampling and holding the first output signal and the second output signal in turn, and outputting a first holding signal and a second holding signal, respectively; and
   a micro controller unit differentiating the first holding signal and the second holding signal, getting a level-estimating-result signal, and comparing the level-estimating-result signal with a predetermined table to acquire the slant and further to obtain tilt information of one direction.

20. The tilt estimating circuit of claim 19, wherein the signal-generating module alternately and multi-directionally inputs the level-measuring signals to the tilt sensor.

21. The tilt estimating circuit of claim 19, wherein an electrical property of the level-measuring signals sent from the signal-generating module are positive, negative or both positive and negative.

22. The tilt estimating circuit of claim 19, wherein the signal-generating module is a signal generator or a pulse generating circuit.

23. The tilt estimating circuit of claim 19, wherein the tilt sensor is a single axis electrolytic tilt sensor or a dual axis electrolytic tilt sensor.

24. The tilt estimating circuit of claim 19, wherein the sample and hold module is a sample and hold circuit.

25. The tilt estimating circuit of claim 19, wherein the level-measuring signals have a same width and are spaced at one or a plurality of intervals.

26. The tilt estimating circuit of claim 19, wherein the sample and hold module triggers and outputs the first holding signal and the second holding signal according to a plurality of trigger signals, the trigger signals being the level-measuring signals or signals having a same time sequence as the level-measuring signals.

27. A signal sampling circuit, applied in a tilt sensor, wherein the tilt sensor comprises at least a pair of input pins set symmetrically and an output pin, the signal sampling circuit comprising:
   a signal-generating module generating in order a plurality of level-measuring signals with a same cycle and spaced at one or a plurality of intervals, and multi-directionally sending the level-measuring signals to the input pins of the tilt sensor in turn, respectively, to make the output pin of the tilt sensor output a series of output signals composed of a plurality of output signals corresponding to the level-measuring signals;

a sample and hold module, connecting to the signal-generating module, receiving in order the level-measuring signals as a plurality of trigger signals, and sampling and holding the series of output signals in turn in accordance with the trigger signals to divide the series of output signals, and then outputting a plurality of holding signals in turn; and a differential module receiving and differentiating the holding signals, and outputting a level-estimating-result signal to a micro controller unit to derive tilt information of one direction, wherein the holding signals correspond to the level-measuring signals input into the input pins set symmetrically and in pairs.

28. The signal sampling circuit of claim 27, wherein the electrical property of the level-measuring signals sent from the signal-generating module are positive, negative or both positive and negative.

29. The signal sampling circuit of claim 27, wherein the signal-generating module is a signal generator or a pulse generating circuit.

30. The signal sampling circuit of claim 27, wherein the tilt sensor is a single axis electrolytic tilt sensor or a dual axis electrolytic tilt sensor.

31. The signal sampling circuit of claim 27, wherein the sample and hold module is a sample and hold circuit.

32. The signal sampling circuit of claim 27, wherein the level-measuring signals have a same width and are spaced at one or a plurality of intervals.

* * * * *